United States Patent
Feng et al.

(10) Patent No.: US 12,493,080 B2
(45) Date of Patent: Dec. 9, 2025

(54) ELECTRICAL DEVICE, METHOD FOR CONTROLLING ELECTRICAL DEVICE AND COMPUTER READABLE STORAGE MEDIUM

(71) Applicant: Schneider Electric (China) Co., Ltd., Beijing (CN)

(72) Inventors: Jie Feng, Beijing (CN); Jiawei Liu, Beijing (CN); Han Wang, Beijing (CN); Chunchao Hu, Beijing (CN); Yangfeng Song, Beijing (CN); Jingjing Ding, Beijing (CN); Wanlong Bai, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 134 days.

(21) Appl. No.: 18/521,754

(22) Filed: Nov. 28, 2023

(65) Prior Publication Data
US 2025/0110188 A1 Apr. 3, 2025

(30) Foreign Application Priority Data
Sep. 28, 2023 (CN) .......................... 202311278240.3

(51) Int. Cl.
*H01H 31/02* (2006.01)
*G01R 19/165* (2006.01)
(Continued)

(52) U.S. Cl.
CPC ....... *G01R 31/52* (2020.01); *G01R 19/16566* (2013.01); *H02H 1/0007* (2013.01)

(58) Field of Classification Search
CPC . G01R 31/52; H02H 3/04; H02H 3/05; H02H 3/07; H02H 3/066; H02H 3/0007
See application file for complete search history.

(56) References Cited

U.S. PATENT DOCUMENTS

2008/0036467 A1* 2/2008 Butler .................. G05B 9/02
324/511
2013/0113507 A1* 5/2013 Danesh ................. G01R 15/04
324/713
(Continued)

FOREIGN PATENT DOCUMENTS

DE 102020216405 A1 6/2022
EP 2355353 A1 8/2011

OTHER PUBLICATIONS

Extended European Search Report dated Jun. 12, 2024 for corresponding European Patent Application No. 23212385.1-1002, 10 pages.

*Primary Examiner* — Thang X Le
(74) *Attorney, Agent, or Firm* — Kinney & Lange, P.A.

(57) ABSTRACT

Embodiments of the present disclosure provide an electrical device, a method for controlling a solid state circuit breaker electrical device, and a computer-readable storage medium. The method comprises: in a closed state of a mechanical switch of the electrical device, closing one of a plurality of electronic switches of the electrical device within a predetermined time period before a zero-crossing point of an input voltage of a bus circuit to which the electrical device is connected; acquiring a current value or a voltage value of a sampling resistor in the electrical device within the predetermined time period; and in response to determining that the current value or the voltage value as acquired is less than or equal to a predetermined threshold, causing an indication component to indicate that there is no short circuit fault in the bus circuit. In this way, it is possible to effectively avoid repeated closing of electronic switches of the electrical device such as a solid state circuit breaker, thereby significantly extending the service life of electronic switches of the electrical device and thereby improving the service life and user experience of the electrical device.

11 Claims, 6 Drawing Sheets

(51) Int. Cl.
 *G01R 31/52* (2020.01)
 *H02H 1/00* (2006.01)

(56) References Cited

U.S. PATENT DOCUMENTS

2020/0366079 A1* 11/2020 Telefus ............. H02J 13/00022
2022/0416681 A1* 12/2022 Telefus ................. H05B 45/10
2023/0067227 A1*  3/2023 Telefus ............... H02M 1/0003

* cited by examiner

ELECTRICAL DEVICE, METHOD FOR CONTROLLING ELECTRICAL DEVICE AND COMPUTER READABLE STORAGE MEDIUM

FIELD

Example embodiments of the present disclosure relates generally to the field of electrical devices, and more particularly, to an electrical device, a method of controlling an electrical device and a computer storage medium.

BACKGROUND

A short circuit refers to the situation where two points with different potentials in a normal circuit are incorrectly directly connected or connected by conductors with very small impedance (or resistance). The current intensity during a short circuit is very high, which often damages electrical equipment or causes fires. Hazards caused by a short circuit can be avoided as much as possible by precautions (such as using circuits that comply with building and electrical usage specifications) or using fusible cutouts (such as fuses), circuit breakers, or other overload protectors to break the circuit when the current is too large. For example, when a circuit breaker is used, the circuit breaker will be tripped to cut off the circuit to protect the electrical appliances and circuits. However, if a short circuit occurs and is closed directly without pre-diagnosis to the short circuit, it may cause irreparable effects on both the circuit and the switch.

SUMMARY

Embodiments of the present disclosure provide an electrical device, a method of controlling an electrical device and a computer storage medium.

In a first aspect of the present disclosure, a method of controlling an electrical device is proposed. The method comprises: in a closed state of a mechanical switch of the electrical device, closing one of a plurality of electronic switches of the electrical device within a predetermined time period before a zero-crossing point of an input voltage of a bus circuit to which the electrical device is connected; acquiring a current value or a voltage value of a sampling resistor in the electrical device within the predetermined time period; and in response to determining that the current value or the voltage value as acquired is less than or equal to a predetermined threshold, causing an indication component to indicate that there is no short circuit fault in the bus circuit.

By using the method according to embodiments of the present disclosure, it is possible to diagnose the short circuit fault before closing the electrical device, thereby improving the reliability of the circuit. In addition, according to embodiments of the present disclosure, it can be effectively avoided that electronic switches of an electrical device such as a solid-state circuit breaker being repeatedly closed, thereby significantly extending the life of the electronic switches of the electrical device, and thereby extending the life of the electrical device. In addition, this method can allow a user to choose whether to reclose the electronic switch and the number of reclosing, which improves the user's freedom of choice and thereby improves user experience.

In some embodiments, the method further comprises: in response to determining that the current value or the voltage value as acquired is greater than the predetermined threshold, closing one of the plurality of electronic switches within a predetermined time period before each of subsequent predetermined number of zero-crossing points to acquire a current value or a voltage value of the sampling resistor in the electrical device within the corresponding predetermined time period; and in response to determining that the current value or the voltage value as acquired is less than or equal to the predetermined threshold, causing the indication component to indicate that there is no short circuit fault in the bus circuit.

In some embodiments, the method further comprises: in response to determining that current values or voltage values of the sampling resistor acquired within the subsequent predetermined number of predetermined time periods are greater than the predetermined threshold, causing the plurality of electronic switches and the mechanical switch to remain open.

In some embodiments, the method further comprises: in response to determining that current values or voltage values of the sampling resistor acquired within the subsequent predetermined number of predetermined time periods are greater than the predetermined threshold, causing the indication component to indicate there is a short circuit fault in the bus circuit.

In some embodiments, the method further comprises: acquiring a period or a frequency of the input voltage; and determining the zero-crossing point of the input voltage according to the period or the frequency.

In a second aspect of the present disclosure, an electrical device is provided. The electrical device comprising: a mechanical switch; a plurality of electronic switches connected in series with the mechanical switch; a sampling circuit comprising a sampling resistor; and a control unit coupled to at least the plurality of electronic switches, and configured to: in a closed state of the mechanical switch, close one of the plurality of electronic switches within a predetermined time period before a zero-crossing point of an input voltage of a bus circuit to which the electrical device is connected; acquire a current value or a voltage value of the sampling resistor within the predetermined time period; and in response to determining that the current value or the voltage value as acquired is less than or equal to a predetermined threshold, cause an indication component to indicate that there is no short circuit fault in the bus circuit.

In some embodiments, the control unit is further configured to: in response to determining that the current value or the voltage value as acquired is greater than the predetermined threshold, close one of the plurality of electronic switches within a predetermined time period before each of subsequent predetermined number of zero-crossing points to acquire a current value or a voltage value of the sampling resistor within the corresponding predetermined time period; and in response to determining that the current value or the voltage value as acquired is less than or equal to the predetermined threshold, cause the indication component to indicate that there is no short circuit fault in the bus circuit.

In some embodiments, the control unit is further configured to: in response to determining that current values or voltage values of the sampling resistor acquired within the subsequent predetermined number of predetermined time periods are greater than the predetermined threshold, cause the plurality of electronic switches and the mechanical switch to remain open.

In some embodiments, the control unit is further configured to: in response to determining that current values or voltage values of the sampling resistor acquired within the subsequent predetermined number of predetermined time periods are greater than the predetermined threshold, cause the indication component to indicate there is a short circuit fault in the bus circuit.

In some embodiments, the control unit is further configured to: acquiring a period or a frequency of the input voltage; and determining the zero-crossing point of the input voltage according to the period or the frequency.

In the third aspect of the present disclosure, a computer-readable storage medium is provided. The computer-readable storage medium stores a computer program that can be executed by a processor to implement the method of the first aspect.

It should be understood that the content described in this section is not intended to limit critical or important features of embodiments of the present disclosure, nor is it used to limit the scope of the present disclosure. Other features of the present disclosure will become easier to be understood through the following description.

BRIEF DESCRIPTION OF THE DRAWINGS

The above and other features, advantages, and aspects of each embodiment of the present disclosure will become more apparent in conjunction with the accompanying drawings and with reference to the following detailed explanations. In the accompanying drawings, the same or similar reference symbols represent the same or similar elements, where.

DETAILED DESCRIPTION

Figure 1:
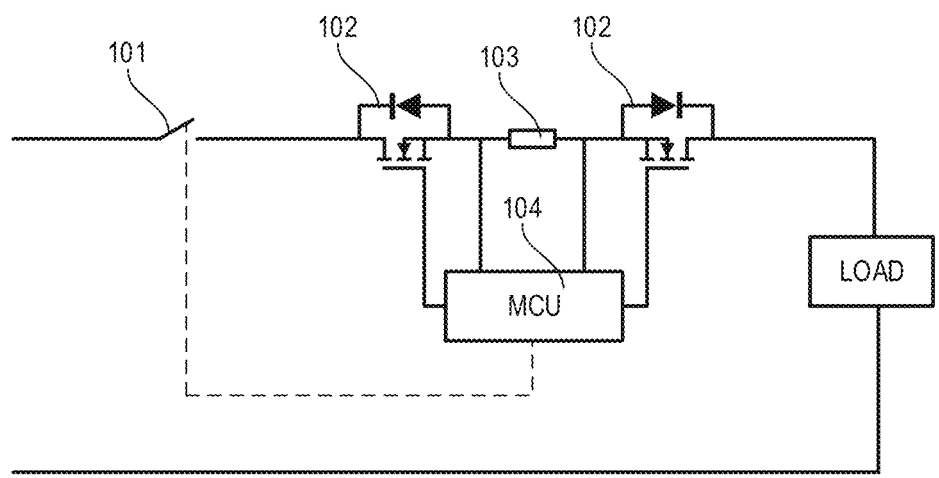
FIG. 1 shows a simplified block diagram of an example structure of an electrical device according to some embodiments of the present disclosure.

Embodiments of the present disclosure will be described in more detail below with reference to the accompanying drawings. Although certain embodiments of the disclosure are illustrated in the drawings, it should be understood that the present disclosure may be embodied in various forms and should not be construed as limited to the embodiments set forth herein, but rather, these embodiments are provided for a more thorough and complete understanding of the present disclosure. It should be understood that the drawings and embodiments of the present disclosure are for illustrative purposes only and are not intended to limit the scope of the present disclosure.

In descriptions of embodiments of the present application, the term "comprise(s)" and its variants used herein indicate open inclusion, that is, "comprising but not limited to". The term "based on" should be interpreted as "based at least in part on". The terms "an embodiment" and "the embodiment" should be interpreted as "at least one exemplary embodiment". The term "some embodiments" should be interpreted as "at least some embodiments". Other explicit and implicit definitions may be included below. The terms "first", "second", etc., may refer to different or the same object. Other explicit and implicit definitions may also be included below.

As mentioned briefly above, hazards caused by a short circuit can be avoided as much as possible by precautions (such as using circuits that comply with building and electrical usage specifications) or using fusible cutouts (such as fuses), circuit breakers, or other overload protectors. In some cases, electrical devices such as solid-state circuit breakers are used to deal with short circuit faults in a circuit. When a short circuit fault occurs, the electrical device can be tripped and opened to protect the safety of electrical appliances and circuits. When a short circuit occurs, and if it is closed directly without pre-diagnosis to the short circuit, it may cause irreparable effects on both of the circuit and switch.

Embodiments of the present disclosure provide a method for controlling an electrical device and an electrical device to solve or at least partially solve the above problems or other potential problems present in conventional solutions. The electrical device mentioned herein may comprise a solid state circuit breaker. Of course, it should be understood that the electrical device mentioned herein may also comprise any suitable electrical device having electronic switches 102, a mechanical switch 101, and at least the electronic switches 102 can be controlled by a control unit 104. FIG. 1 shows a principal diagram of a structural of an electrical device according to embodiments of the present disclosure. As shown in FIG. 1, the electrical device according to embodiments of the present disclosure comprises a mechanical switch 101, electronic switches 102, a sampling circuit, and a control unit 104. The control unit 104 may comprise a microprocessor (MCU) arranged in the electrical device.

The mechanical switch 101 and the electronic switches 102 are connected in series. During closing of the electrical device, usually the mechanical switch 101 is closed first, and then the control unit 104 controls the electronic switches 102 to be closed, thereby achieving conduction of the circuit. During opening or tripping of the electrical device, the electronic switches 102 are usually controlled to be opened first, and then the mechanical switch 101 is controlled to be opened.

The electrical device according to embodiments of the present disclosure comprises a plurality of electronic switches 102. In embodiments as shown in FIG. 1, the electrical device comprises two electronic switches 102. Of course, embodiments of the present disclosure do not limit this. The electronic switches 102 as used may use a field-effect transistor (FET), such as a junction field-effect transistor (JFET) and a metal-oxide semiconductor field-effect transistor (MOSFET). A gate of the FET may be coupled to an output port for control signals of the control unit 104 to control on and off of the FET (i.e., electronic switch 102) by the control unit 104. In some embodiments, the electronic switch 102 may also comprise an insulated gate bipolar transistor (IGBT) or any other suitable type of transistor.

The electrical device may further comprise an indication component, such as at least one of a display, an indicator light, an audio output module (a speaker or a horn), to be used to indicate a state of the electrical device and the entire circuit by an appropriate manner.

The sampling circuit of the electrical device typically comprises a sampling resistor 103 arranged at an appropriate position (e.g., between two electronic switches 102) of a circuit of the electrical device. The control unit 104 can acquire the voltage on the sampling resistor 103 by appropriate means and determines the current flowing through the sampling resistor 103 according to a resistance value of the sampling resistor 103 to achieve current or voltage sampling. The method according to embodiments of the present disclosure can determine whether there is still a short circuit fault in the bus circuit according the comparison of the current value and the voltage value as acquired with a threshold value.

Figure 2:
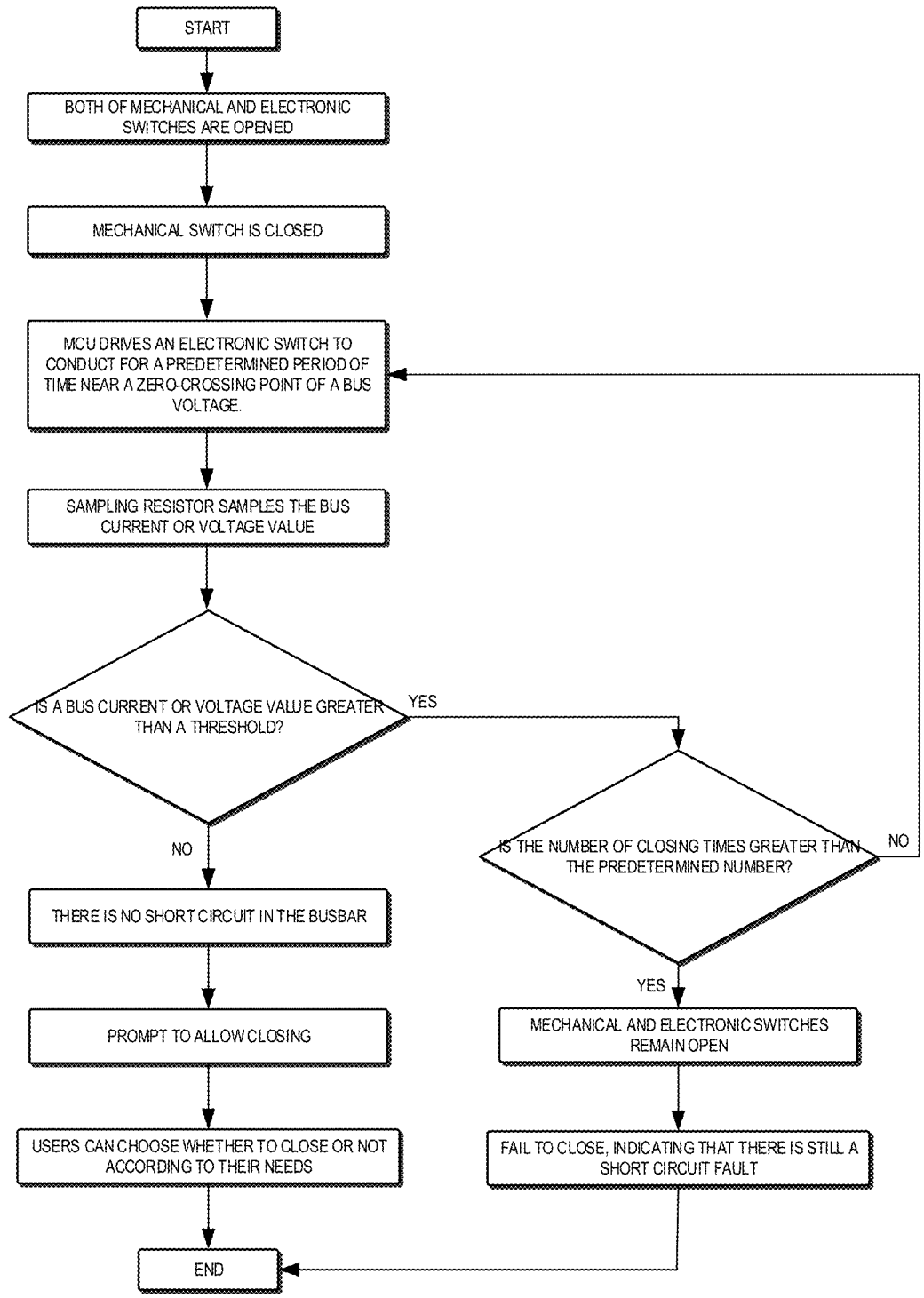
FIG. 2 shows a schematic flow diagram of a method of controlling an electrical device according to some embodiments of the present disclosure.

FIG. 2 shows a schematic flow diagram of a method for controlling the electrical device according to embodiments of the present disclosure. As shown in FIG. 2, for example, in a case where the electrical device is tripped due to a short circuit fault of the bus circuit, the mechanical switch 101 and the electronic switches 102 are all in an open state. Of course, it should be understood that the premise of executing the present method may not be the case of a short circuit fault, that is, users may also open the mechanical switch 101 and the electronic switches 102 manually or through the control unit 104.

When the mechanical switch 101 and the electronic switches 102 are all in the open state, in order to determine whether there is still a short circuit fault in the bus circuit, the mechanical switch 101 needs to be closed (which may be controlled or manually closed by the control unit 104). After the mechanical switch 101 is closed, the control unit 104 will control any one of the multiple electronic switches 102 to close within a predetermined time period before a zero-crossing point of the input voltage of the bus circuit. For example, the predetermined time period may refer to a period of 1 ms to 5 ms (e.g. 1.5 ms) from a time point before the voltage zero-crossing point to the voltage zero-crossing point. After the voltage zero-crossing point, the closed electronic switch will be automatically opened. The predetermined time period also corresponds to a certain phase angle, so it may also be said to control an electronic switch 102 to close in a small phase angle (also referred to as an angle) near the voltage zero-crossing point, as shown in FIGS. 3 and 4.

It should be understood that the voltage zero-crossing points herein may refer to voltage zero-crossing points with an interval of half a period or voltage zero-crossing points with an interval of one period. For the voltage zero-crossing points with an interval of half a period, different electronic switches are closed at two adjacent voltage zero-crossing points. For the voltage zero-crossing points with an interval of one period, the same electronic switch is closed at two adjacent voltage zero-crossing points. In the following, the concept of the present disclosure is mainly described by taking different electronic switches being closed near voltage zero-crossing points with an interval of half a period as an example. It should be understood that the same electronic switch being closed near voltage zero-crossing points with an interval of one period is also similar, and will not be repeated separately in the following text.

Then, the current value or the voltage value flowing through the sampling resistor 103 is acquired from the current sampling circuit during this time period. If the current value or the voltage value is less than or equal to a predetermined threshold, which indicates that there is no circuit fault in the bus circuit, users may be allowed to perform subsequent closing operations. At this time, the control unit 104 may make the indication component indicate in an appropriate manner that there is no short circuit fault in the bus circuit.

Figure 3:
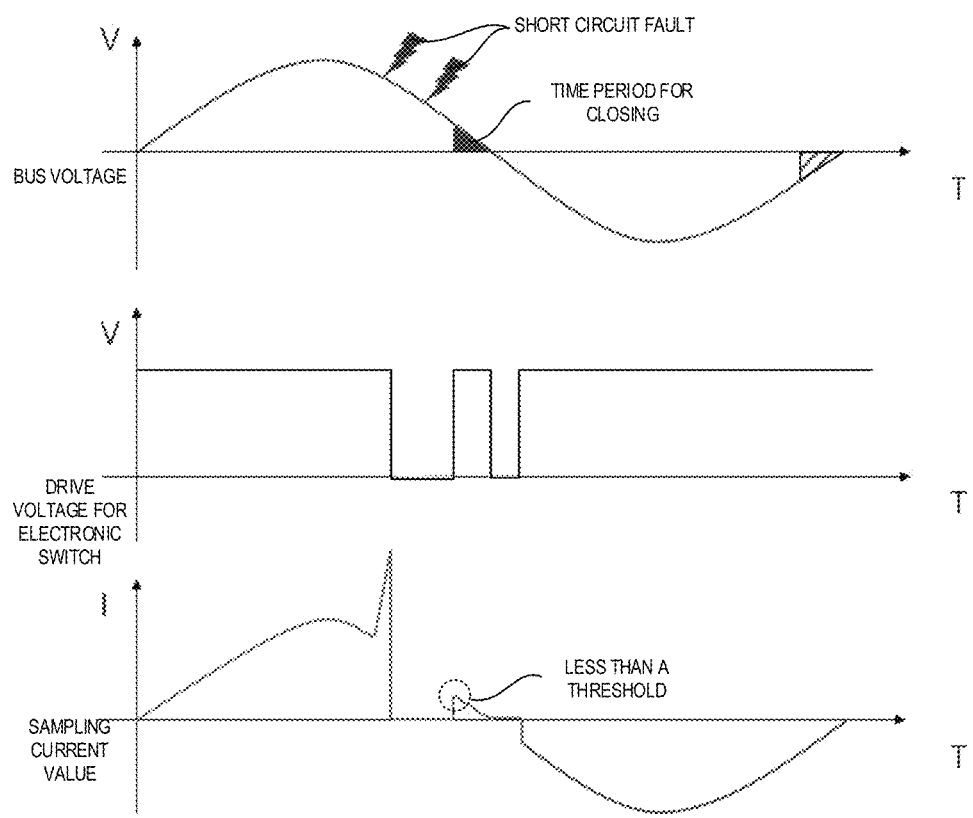
FIGS. 3 and 4 illustrate waveform diagrams in processes of controlling an electrical device using a method according to some embodiments of the present disclosure.
Figure 4:
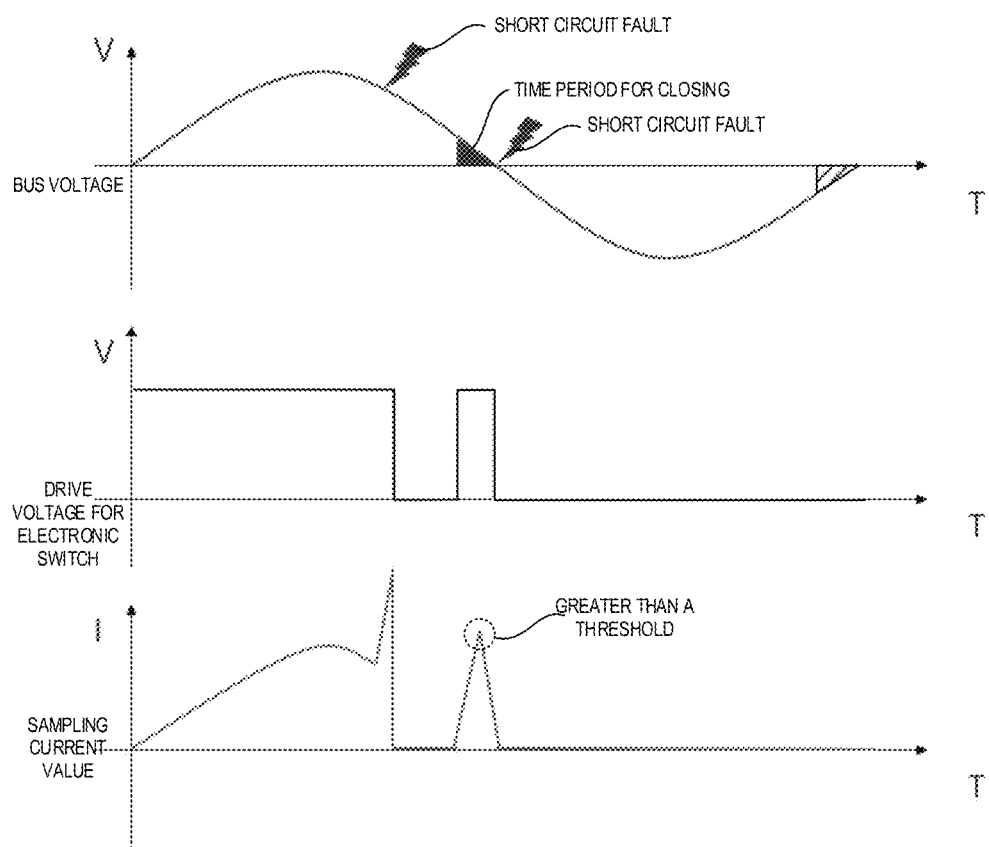

FIGS. 3 and 4 show sequence diagrams for circuit diagnosis using a method according to embodiments of the present disclosure. As shown in FIG. 3, within a predetermined time period before the zero-crossing point of the input voltage of the bus circuit (also referred to as the bus voltage), the control unit 104 closes one of the electronic switches 102. During this process, the current value or the voltage value as acquired on the sampling resistor 103 (the sampled current value in the Figure) is less than a predetermined threshold, indicating that there is no short circuit fault in the bus circuit, and users may be allowed to perform subsequent closing operations.

FIG. 4 shows a similar timing process, except that within a predetermined time period before the voltage zero-crossing point in which one of the electronic switches 102 is closed, the current value as acquired on the sampling resistor 103 is greater than a predetermined threshold, indicating that there is still a short circuit fault in the bus circuit at this time. In this case, considering that the short circuit fault often exists for a short time, a plurality of diagnoses may be performed when the short circuit fault still exists. That is to say, in some embodiments, if it is determined that the current value or voltage value acquired on the sampling resistor 103 is greater than a predetermined threshold, the control unit 104 will close the corresponding electronic switch 102 within a predetermined time period before each zero-crossing point of the subsequent predetermined number of zero-crossing points, and respectively acquire the current value of the sampling resistor 103 corresponding to the predetermined time period.

Figure 5:
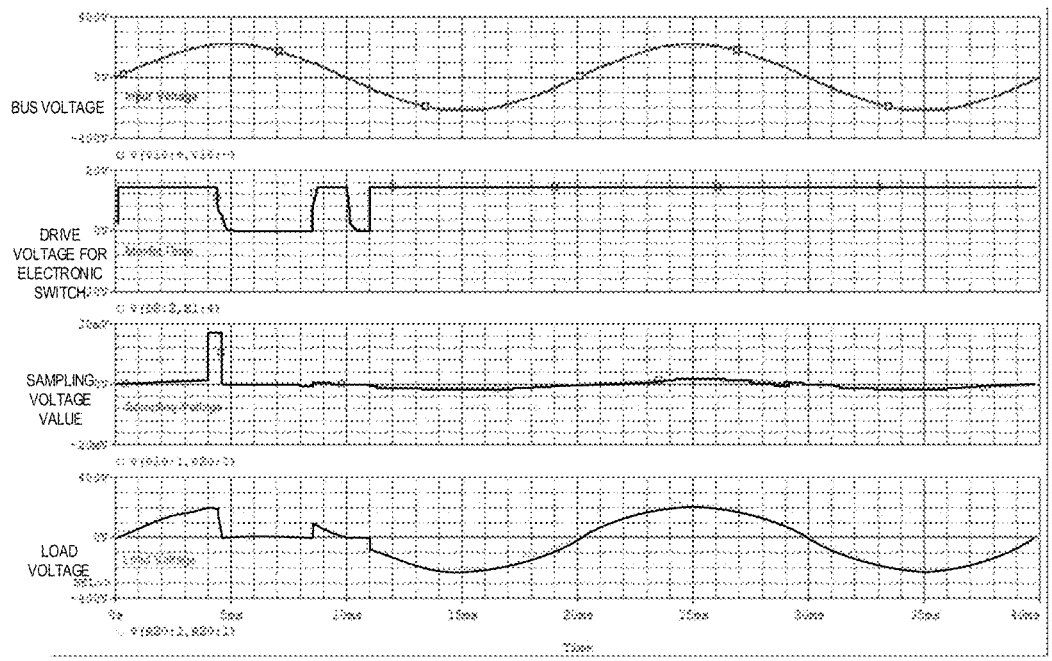
FIGS. 5 and 6 illustrate simulation waveform diagrams in processes of controlling an electrical device using a method according to some embodiments of the present disclosure.

Of course, the predetermined number or the predetermined number of times may be arbitrarily set as needed, for example, the predetermined number of times may be 1, 2, 3 or more times, and embodiments of the present disclosure are not specifically limited to this. For example, assuming that the predetermined number of times is 3 times, if the detected current value is greater than the predetermined threshold after a first electronic switch 102 (hereinafter referred to as a first electronic switch) is closed in a predetermined time period before the voltage zero-crossing point, another electronic switch 102 (hereinafter referred to as a second electronic switch) may be closed in a predetermined time period (as shown in FIGS. 4 and 5 filled with diagonal lines) before the voltage zero-crossing point in the next half period, and then the current on the sampling resistor 103 is detected. If the current value detected for the second time is less than or equal to the predetermined threshold, which indicates that the short circuit fault has been eliminated, the indication component may be caused to indicate that there is no short circuit fault in the bus circuit, and no subsequent diagnosis will be performed.

If the current value detected after closing the second electronic switch 102 in the predetermined time period before the voltage zero-crossing point for the second time is still greater than the predetermined threshold, a third diagnosis will be performed, i.e., the first electronic switch 102 is closed again in a predetermined time period before the voltage zero-crossing point in the next half period and the current value on the sampling resistor 103 is further detected. If the predetermined number of times is more times, the subsequent processes are similar, until a current value or a voltage value on the sampling resistor 103 measured by a diagnosis is less than a predetermined threshold or reaches the predetermined number of times set.

Specifically, if a current value or a voltage value (the sampling current value in the figures) on the sampling resistor 103 after one of the electronic switches is closed at a certain time is less than the predetermined threshold, which indicates that there is no circuit fault in the bus circuit, users may be allowed to perform subsequent closing operations without continuing subsequent detections. If the predetermined number of times is n (n is a non-zero natural number) times, the current values obtained in n times of detections are all greater than the predetermined threshold, which indicates that there is still a short circuit fault in the bus circuit, the control unit 104 may make the electronic switches 102 and mechanical switch 101 of the electrical device remain in the open state at this time. In some embodiments, the control unit 104 may also cause the indication component to indicate the short circuit fault in the bus circuit in this case, to remind users not to close the electrical device and to timely eliminate the short circuit fault in the bus circuit.

Figure 6:
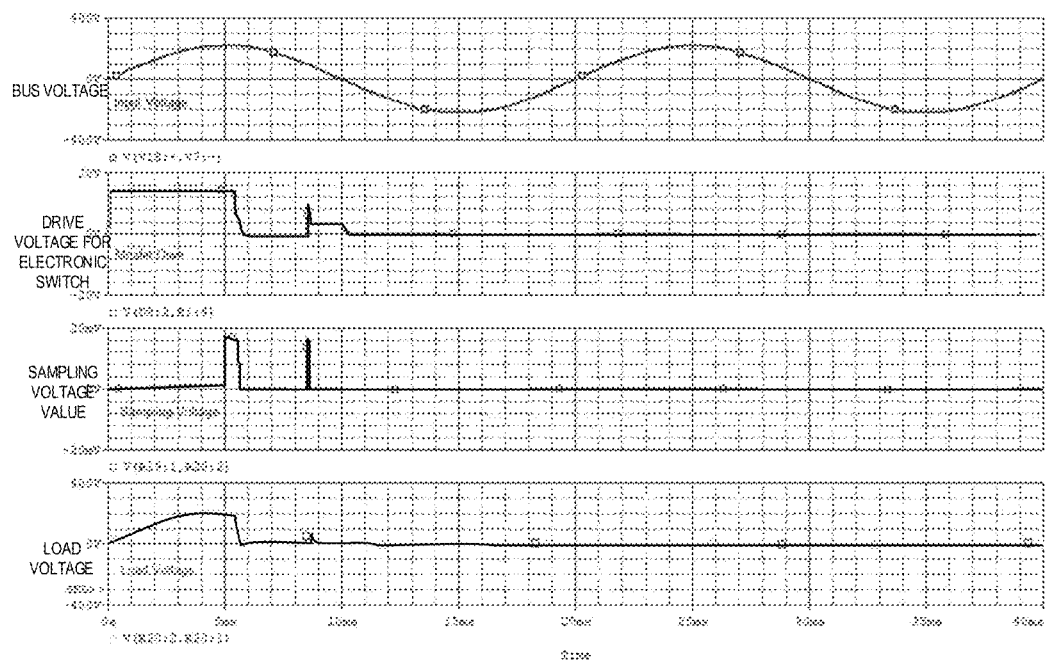

FIGS. 5 and 6 show simulation waveform diagrams of the method according to embodiments of the present disclosure. In FIGS. 5 and 6, from top to bottom, a voltage waveform of the bus circuit, a waveform of the control signal for the electronic switch 102, a waveform of the sampling voltage of the sampling resistor 103 and a voltage waveform of loads connected to the bus circuit are shown respectively. As may be seen from the waveform diagrams of FIGS. 5 and 6, the method according to embodiments of the present disclosure may also use the comparison between the sampling voltage value on the sampling resistor 103 and the threshold value to determine whether there is still a short circuit fault in the circuit.

In the simulation diagram as shown in FIG. 5, a short circuit fault occurred in the bus circuit during the time period of 4 ms-7 ms. When the short circuit occurs, the sampling resistor 103 collects a large current (reflected as a peak voltage in the waveform of the sampling voltage on the sampling resistor 103), and the control unit 104 will open the electronic switches 102 at this time (then the voltage drops to 0 in the waveform diagram of the control signal of the electronic switch 102). Since a short circuit occurs in the circuit, the voltage of loads is 0.

The input voltage of the bus circuit crosses zero at 10 ms, and the control unit 104 closes an electronic switch 102 for a small angle within a predetermined time period (from 8.5 ms to 10 ms) before the input voltage of the bus circuit crosses zero. Since the electronic switch 102 is closed at this time, the circuit is turned on, so there will be a voltage signal on the sampling resistor 103 and loads.

As shown in FIG. 5, by acquiring the voltage value on the sampling resistor 103, the control unit 104 converts the voltage value into a current value (or uses it directly without conversion). By comparing it with a predetermined threshold value, the control unit determines that the sampled current value or the voltage value is less than the predetermined threshold, which indicates that the circuit short circuit fault is eliminated. At this time the control unit 104 may cause the indication component to indicate that the short circuit fault has been eliminated, allowing users to close the electrical device. For the purpose of simulation, the effectiveness of the method according to embodiments of the present disclosure is verified using the simulation software to simulate the closing process in the figure, that is, the control unit 104 drives the electronic switch 102, and the closing is successful.

In the simulation diagram as shown in FIG. 6, a short circuit fault occurred in the bus circuit during 5 ms-10 ms. When the short circuit occurs, the sampling resistor 103 collects a large current (reflected as a peak voltage in the waveform of the sampling voltage on the sampling resistor 103), and the control unit 104 will turn off the electronic switches 102 at this time (the voltage drops to 0 in the waveform diagram of the control signal of the electronic switch 102). Since the short circuit occurs in the circuit, the voltage of loads is 0.

The input voltage of the bus circuit crosses zero at 10 ms, and the control unit 104 closes an electronic switch 102 for a small angle within a predetermined time period (from 8.5 ms to 10 ms) before the input voltage of the bus circuit crosses zero. At this time, since the electronic switch 102 is closed, and the short circuit fault has not been eliminated, so there will still be a large voltage on the sampling resistor 103, and since the short circuit still exists, the voltage on the loads is 0.

By acquiring the voltage value on the sampling resistor 103, the control unit 104 converts the voltage value into a current value (or uses it directly without conversion). By comparing it with a predetermined threshold, if the control unit determines that the sampling current value or the voltage value is greater than the predetermined threshold, which means that the short circuit fault in the circuit is not eliminated, and the electronic switches 102 are still in an open state at this time. Since the number of retries set by this simulation is 1, the control unit 104 will not continue to diagnose, and open the electronic switches 102 while causing the indication component to indicate that there is still a short circuit fault in the bus circuit, to prompt users not to close the electrical device and to perform circuit maintenance to eliminate the short circuit fault.

Figure 7:
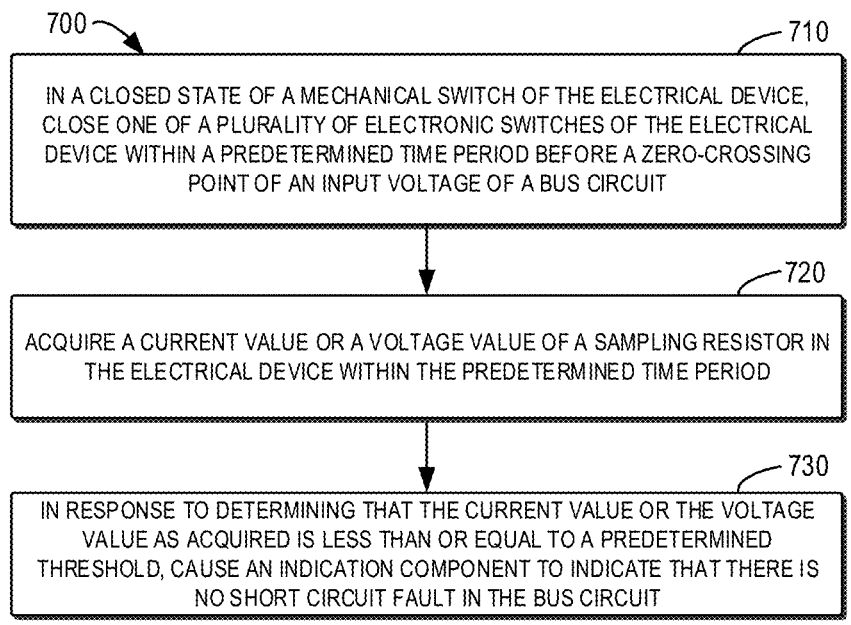
FIG. 7 shows a flowchart of an example method for controlling an electrical device according to some embodiments of the present disclosure.

FIG. 7 shows a flowchart of an example method 700 for controlling an electrical device according to some embodiments of the present disclosure. The method 700 may be implemented, for example, at the control unit as mentioned above. The method 700 is described below with reference to FIG. 7. It should be understood that the method 700 may comprise additional actions not shown and/or actions as shown may be omitted, and the scope of the present disclosure is not limited in this respect.

In block 710, in a closed state of the mechanical switch 101 of the electrical device, within a predetermined time period before a zero-crossing point of the input voltage of the bus circuit to which the electrical device is connected, the control unit 104 causes one of a plurality of electronic switches 102 of the electrical device 102 to be closed. In block 720, the control unit 104 acquires the current value or the voltage value of a sampling resistor 103 in the electrical device within the predetermined time period. In block 730, in response to determining that the current value or the voltage value as acquired is less than or equal to a predetermined threshold, the control unit 104 causes the indication component to indicate there is no short circuit fault in the bus circuit.

In some embodiments, if the control unit 104 determines that the current value or the voltage value as acquired is greater than the predetermined threshold, the control unit 104 may causes one of the plurality of electronic switches 102 to be closed within a predetermined time period before each of subsequent predetermined number of zero-crossing points to acquire a current value or a voltage value of the sampling resistor 103 in the electrical device within the corresponding predetermined time period. If during this process, the control unit 104 determines that the current value or the voltage value as acquired is less than or equal to the predetermined threshold, the control unit 104 may cause the indication component to indicate that there is no short circuit fault in the bus circuit.

In some embodiments, if it is determined that current values or voltage values of the sampling resistor 103 acquired within the subsequent predetermined number of predetermined time periods are greater than the predetermined threshold, the control unit 104 causes the plurality of electronic switches 102 and the mechanical switch 101 to remain open.

In some embodiments, if it is determined that current values or voltage values of the sampling resistor 103 acquired within the subsequent predetermined number of predetermined time periods are greater than the predetermined threshold, the control unit 104 may cause the indication component to indicate there is a short circuit fault in the bus circuit.

In some embodiments, the control unit 104 may also acquire a period or a frequency of the input voltage of the bus circuit in an appropriate manner, and determine the zero-crossing point of the input voltage according to the period or the frequency. The subsequent operation of closing an electronic switch may be performed near the zero-crossing point as needed to realize the diagnosis for the circuit.

In accordance with exemplary implementations of the present disclosure, there is also provided a computer readable storage medium having computer executable instructions stored thereon, wherein the computer executable instructions are executed by a processor to implement the method 700 described above.

Various aspects of the present disclosure are described herein with reference to flowcharts and/or block diagrams of methods, apparatus, devices, and computer program products implemented in accordance with the present disclosure. It should be understood that each block of the flowcharts and/or block diagrams and combinations of the blocks in the flowcharts and/or block diagrams may be implemented by computer-readable program instructions.

These computer-readable program instructions may be provided to a processing unit of a general-purpose computer, special purpose computer, or other programmable data processing device to produce a machine that, when executed by a processing unit of a computer or other programmable data processing device, produces a device that implements the functions/actions specified in one or more blocks in the flowchart and/or block diagrams. These computer-readable program instructions may also be stored in a computer-readable storage medium, which causes the computer, programmable data processing device, and/or other device to operate in a specific manner. Thus, the computer-readable medium storing the instructions comprises an article of manufacture that comprises instructions for implementing various aspects of the functions/actions specified in one or more blocks in the flowchart and/or block diagrams.

Computer-readable program instructions may be loaded onto a computer, other programmable data processing device, or other device to perform a series of operational steps on the computer, other programmable data processing device, or other device to produce a computer-implemented process, so that the instructions executed on the computer, other programmable data processing device, or other device implement the functions/actions specified in one or more blocks in the flowchart and/or block diagram.

The flowcharts and block diagrams in the accompanying drawings show the architecture, functions, and operations of possible implementations of systems, methods, and computer program products according to the present disclosure. In this regard, each block in the flowcharts or block diagrams may represent a module, program segment, or part of an instruction that contains one or more executable instructions for implementing a specified logical function. In some alternative implementations, the functions marked in the blocks may also occur in a different order than those marked in the drawings. For example, two consecutive blocks may actually be executed in substantially parallel, and they may sometimes be executed in the opposite order, depending on the functions involved. It should also be noted that each block in the diagrams and/or flowcharts, as well as combinations of blocks in the diagrams and/or flowcharts, may be implemented using a dedicated hardware-based system that performs the specified functions or actions, or may be implemented using a combination of dedicated hardware and computer instructions.

Various embodiments of the present disclosure have been described above, which are exemplary, not exhaustive, and are not limited to the disclosed embodiments. Without deviating from the scope and spirit of the various embodiments explained, many modifications and changes are apparent for those skilled in the art. The selection of terms used herein is intended to best explain the principles, practical applications, or technological improvements in the market of each embodiment, or to enable those skilled in the art to understand the disclosed embodiments.

What is claimed is:

1. A method for controlling an electrical device, comprising:
   in a closed state of a mechanical switch of the electrical device, closing one of a plurality of electronic switches of the electrical device within a predetermined time period before a zero-crossing point of an input voltage of a bus circuit to which the electrical device is connected;
   acquiring a current value or a voltage value of a sampling resistor in the electrical device within the predetermined time period; and
   in response to determining that the current value or the voltage value as acquired is less than or equal to a predetermined threshold, causing an indication component to indicate that there is no short circuit fault in the bus circuit.

2. The method of claim 1, further comprising:
   in response to determining that the current value or the voltage value as acquired is greater than the predetermined threshold, closing one of the plurality of electronic switches within a predetermined time period before each of subsequent predetermined number of zero-crossing points to acquire a current value or a voltage value of the sampling resistor in the electrical device within the corresponding predetermined time period; and
   in response to determining that the current value or the voltage value as acquired is less than or equal to the predetermined threshold, causing the indication component to indicate that there is no short circuit fault in the bus circuit.

3. The method of claim 2, further comprising:
   in response to determining that current values or voltage values of the sampling resistor acquired within the subsequent predetermined number of predetermined time periods are greater than the predetermined threshold, causing the plurality of electronic switches and the mechanical switch to remain open.

4. The method of claim 2, further comprising:
   in response to determining that current values or voltage values of the sampling resistor acquired within the subsequent predetermined number of predetermined time periods are greater than the predetermined threshold, causing the indication component to indicate there is a short circuit fault in the bus circuit.

5. The method of claim 1, further comprising:
acquiring a period or a frequency of the input voltage; and
determining the zero-crossing point of the input voltage according to the period or the frequency.

6. An electrical device comprising:
a mechanical switch;
a plurality of electronic switches connected in series with the mechanical switch;
a sampling circuit comprising a sampling resistor; and
a control unit coupled to at least the plurality of electronic switches, and configured to:
in a closed state of the mechanical switch, close one of the plurality of electronic switches within a predetermined time period before a zero-crossing point of an input voltage of a bus circuit to which the electrical device is connected;
acquire a current value or a voltage value of the sampling resistor within the predetermined time period; and
in response to determining that the current value or the voltage value as acquired is less than or equal to a predetermined threshold, cause an indication component to indicate that there is no short circuit fault in the bus circuit.

7. The electrical device of claim 6, wherein the control unit is further configured to:
in response to determining that the current value or the voltage value as acquired is greater than the predetermined threshold, close one of the plurality of electronic switches within a predetermined time period before each of subsequent predetermined number of zero-crossing points to acquire a current value or a voltage value of the sampling resistor within the corresponding predetermined time period; and
in response to determining that the current value or the voltage value as acquired is less than or equal to the predetermined threshold, cause the indication component to indicate that there is no short circuit fault in the bus circuit.

8. The electrical device of claim 7, wherein the control unit is further configured to:
in response to determining that current values or voltage values of the sampling resistor acquired within the subsequent predetermined number of predetermined time periods are greater than the predetermined threshold, cause the plurality of electronic switches and the mechanical switch to remain open.

9. The electrical device of claim 7, wherein the control unit is further configured to:
in response to determining that current values or voltage values of the sampling resistor acquired within the subsequent predetermined number of predetermined time periods are greater than the predetermined threshold, cause the indication component to indicate there is a short circuit fault in the bus circuit.

10. The electrical device of claim 6, wherein the control unit is further configured to:
acquire a period or a frequency of the input voltage; and
determine the zero-crossing point of the input voltage according to the period or the frequency.

11. A non-transitory computer readable storage medium having a computer program stored thereon, the computer program being executable by a processor to implement a method according to claim 1.

* * * * *